US011159561B2

(12) United States Patent
Ma et al.

(10) Patent No.: US 11,159,561 B2
(45) Date of Patent: Oct. 26, 2021

(54) METHOD, APPARATUS AND SYSTEM FOR QUANTIFYING DEFENSE RESULT

(71) Applicant: Alibaba Group Holding Limited, Grand Cayman (KY)

(72) Inventors: Lele Ma, Zhejiang (CN); Jianyue Zhu, Zhejiang (CN); Jiarui Zhu, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 566 days.

(21) Appl. No.: 15/887,796

(22) Filed: Feb. 2, 2018

(65) Prior Publication Data

US 2018/0159895 A1 Jun. 7, 2018

Related U.S. Application Data

(63) Continuation of application No. PCT/CN2016/090812, filed on Jul. 21, 2016.

(30) Foreign Application Priority Data

Aug. 3, 2015 (CN) .......................... 201510479361.3

(51) Int. Cl.
*H04L 29/06* (2006.01)
*H04L 12/851* (2013.01)

(52) U.S. Cl.
CPC .......... *H04L 63/1458* (2013.01); *H04L 29/06* (2013.01); *H04L 47/2425* (2013.01); *H04L 63/1425* (2013.01); *H04L 69/163* (2013.01)

(58) Field of Classification Search
CPC ... H04L 29/06; H04L 47/2425; H04L 69/163; H04L 63/1458; H04L 63/1425
See application file for complete search history.

(56) References Cited

U.S. PATENT DOCUMENTS 7,331,060 B1 * 2/2008 Ricciulli ............. H04L 63/1458
709/227
2003/0145232 A1 7/2003 Poletto et al.
(Continued)

FOREIGN PATENT DOCUMENTS

| CN | 101127649 | 2/2008 |
| CN | 101299724 | 11/2008 |
| CN | 101383694 | 3/2009 |

OTHER PUBLICATIONS

Translation of International Search Report from corresponding PCT application No. PCT/CN2016/090812 dated Oct. 10, 2016, 2 pages.
(Continued)

*Primary Examiner* — Philip J Chea
*Assistant Examiner* — Mohammed Ahmed
(74) *Attorney, Agent, or Firm* — Lee & Hayes, P.C.

(57) ABSTRACT

A method including acquiring a suspect data traffic set, the suspect data traffic set including data traffic corresponding to each suspect IP address in a suspect IP address set included in original data traffic drawn by a defense terminal located in a cloud platform; acquiring normal data traffic, the normal data traffic being data traffic that remains after the defense terminal cleans the suspect data traffic set according to a preset defense strategy; acquiring host performance parameters, the host performance parameters being a set of parameters extracted from the target terminal after the defense terminal sends the normal data traffic to the target terminal; and quantifying a defense result based on a target parameter set, wherein the target parameter set at least includes: the suspect data traffic set, the normal data traffic and the host performance parameters. The defense result is accurate by comprehensively considering evaluation aspects and indexes.

18 Claims, 7 Drawing Sheets

(56) References Cited

U.S. PATENT DOCUMENTS

| | | | |
|---|---|---|---|
| 2009/0077632 A1* | 3/2009 | Carpenter | H04L 67/10 |
| | | | 726/3 |
| 2011/0107412 A1 | 5/2011 | Lee et al. | |
| 2014/0283051 A1* | 9/2014 | Doron | H04L 63/1458 |
| | | | 726/23 |
| 2016/0048682 A1* | 2/2016 | Gou | G06F 1/329 |
| | | | 726/22 |
| 2018/0046811 A1* | 2/2018 | Andriani | H04L 63/1425 |

OTHER PUBLICATIONS

Translation of Written Opinion from corresponding PCT application No. PCT/CN2016/090812 dated Oct. 10, 2016, 5 pages.
Cannady, "Next Generation Intrustion Detection: Autonomous Reinforcement Learning of Network Attacks", Proceedings of the 23rd National Information Systems Security Conference; Baltimore, Maryland; Oct. 19, 2000; pp. 1-12.
Translation of Chinese Office Action from Chinese Patent Application No. 201510479361.3, dated Nov. 1, 2018, 4 pages.
Translation of Chinese Search Report from Chinese Patent Application No. 201510479361.3, dated Oct. 11, 2018, 1 pages.
Extended European Search Report dated Dec. 5, 2018 for European Patent Application No. 16832200.6, 7 pages.

\* cited by examiner

METHOD, APPARATUS AND SYSTEM FOR QUANTIFYING DEFENSE RESULT

CROSS REFERENCE TO RELATED PATENT APPLICATIONS

This application claims priority to and is a continuation of PCT Patent Application No. PCT/CN2016/090812, filed on 21 Jul. 2016, which claims priority to Chinese Patent Application No. 201510479361.3, filed on 3 Aug. 2015, entitled "Method, Apparatus and System for Quantifying Defense Result," which are hereby incorporated by reference in their entirety.

TECHNICAL FIELD

The present disclosure relates to the field of network technologies, and, more particularly, to methods, apparatuses, and systems for quantifying a defense result.

BACKGROUND

The continuous progress of network technologies has resulted in increasingly more network attacks. At present, the Distributed Denial of Service (DDoS) has become a severe attack means among many network attacks. Therefore, a defense terminal is added to an original system architecture to block DDoS attacks.

FIG. 1 is a schematic diagram of an existing network system architecture. As shown in FIG. 1, the system architecture includes a service terminal 102, a router device 104, a defense terminal 106, and a target terminal 108. The service terminal 102 includes a normal service terminal and an attack terminal. The attack terminal may send various forms of attack data traffic. The defense terminal 106 may block the attack data traffic according to its internal defense strategies.

A lot of attack traffic would attack the target terminal if the defense strategy in the defense terminal is too loose. However, normal data traffic sent by a normal service terminal to the target terminal would be affected if the defense strategy is too strict. Therefore, it is necessary to evaluate the defense result of the defense strategy of the defense terminal and determine an appropriate defense strategy according to the defense result.

Currently, the evaluation result of the defense result is incorrect due to an imperfect method, incomprehensive parameters, and incomplete data traffic used in during defense result evaluation.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides methods, apparatuses, and systems for quantifying a defense result, to increase the accuracy of defense result evaluation by improving the evaluation method. Moreover, the integrity of data traffic is further improved with the assistance of a cloud platform.

The present disclosure employs the following technical solutions:

A method for quantifying a defense result, including:

acquiring a suspect data traffic set, the suspect data traffic set including data traffic corresponding to each suspect IP address in a suspect IP address set included in original data traffic after a defense terminal located in a cloud platform draws through a core router the original data traffic of a service terminal accessing a target terminal, and the suspect IP address set being determined in the original data traffic according to a preset detection rule;

acquiring normal data traffic, the normal data traffic being data traffic that remains after the defense terminal cleans the suspect data traffic set according to a preset defense strategy;

acquiring host performance parameters, the host performance parameters being a set of parameters extracted from the target terminal after the defense terminal sends the normal data traffic to the target terminal; and quantifying a defense result based on a target parameter set, wherein the target parameter set at least includes: the suspect data traffic set, the normal data traffic and the host performance parameters.

For example, the target parameter set further includes:

an access success rate sent by a service monitoring apparatus connected to the defense terminal, wherein the access success rate is calculated according to a request success rate and a request delay fed back by the target terminal after the service monitoring apparatus controls multiple service terminals at different geographic locations to access the target terminal.

For example, the target parameter set further includes quality of network service, which is calculated by the defense terminal according to the suspect data traffic set and the normal data traffic.

For example, the preset defense strategy in the suspect traffic cleaning apparatus corresponds to an expected service level agreement (SLA) level; and then, the step of quantifying a defense result based on a target parameter set includes:

determining change value sets of the parameters by using the target parameter set and a preset parameter set, wherein the preset parameter set is a pre-stored set of parameters without any attack data traffic;

matching the change value sets of the parameters with respective parameter ranges in the expected SLA level;

determining that a defense effect of the defense terminal reaches the expected SLA level if the matching succeeds; and determining that the defense effect of the defense terminal does not reach the expected SLA level if the matching fails.

For example, the method further includes:

determining a previous defense strategy of the current defense strategy as the preset defense strategy if the matching fails, wherein the defense terminal stores multiple SLA levels arranged in order and a defense strategy corresponding to each SLA level, a smaller SLA level represents a higher service level enjoyed by the target terminal, and the defense strategy corresponding to a previous SLA level is superior to the defense strategy corresponding to a next SLA level.

For example, the step of determining change value sets of the parameters by using the target parameter set and a preset parameter set includes:

calculating a variation set of a change rate between input protocol packets and output protocol packets according to the suspect data traffic set and the normal data traffic, wherein the input protocol packets are extracted from the suspect data traffic set, and the output protocol packets are extracted from the normal data traffic; and calculating a standard deviation set between a core data set of the normal data traffic and a preset core data set of the preset parameter set, wherein the core data set includes a request response rate, a service success rate, a proportion of 30× status codes, a proportion of 40× status codes, a proportion of 50× status codes, and a delay of a normal user request; and calculating a second change value set between the host performance parameters and preset host performance parameters in the preset parameter set; and/or calculating a third change value set between the access success rate and a preset access success rate in the preset parameter set; and/or calculating a fourth change value set between the quality of network service and preset quality of network service in the preset parameter set.

For example, the step of calculating a variation set of a change rate between input protocol packets and output protocol packets according to the suspect data traffic set and the normal data traffic includes:

calculating a difference between syn packets in an input direction and syn packets in an output direction, and using a ratio of the difference to the syn packets in the input direction as an increase rate of the syn packets;

calculating a difference between syn-ack packets in the input direction and syn-ack packets in the output direction, and using a ratio of the difference to the syn-ack packets in the input direction as an increase rate of the syn-ack packets; and determining a difference between the increase rate of the syn packets and the increase rate of the syn-ack packets as the variation set.

For example, the step of calculating a standard deviation set between a core data set of the normal data traffic and a preset core data set of the preset parameter set includes:

calculating a first standard deviation corresponding to the request response rates, a second standard deviation corresponding to the service success rates, a third standard deviation corresponding to the proportions of 30× status codes, a fourth standard deviation corresponding to the proportions of 40× status codes, a fifth standard deviation corresponding to the proportions of 50× status codes, and a sixth standard deviation corresponding to the delays of a normal user request in the core data set and the preset core data set; and determining a set including the first standard deviation, the second standard deviation, the third standard deviation, the fourth standard deviation, the fifth standard deviation and the sixth standard deviation as the standard deviation set.

For example, the access success rate includes a request success rate and a request delay; and then, the step of calculating a third change value set between the access success rate and a preset access success rate in the preset parameter set includes:

calculating a change rate between the request success rate in the access success rate and the request success rate in the preset access success rate;

calculating a variation between the request delay in the access success rate and the request delay in the preset access success rate; and determining the change rate and the variation as the third change value set.

For example, the host performance parameters include:
the quantity of half-open links after a host of the target terminal receives the first syn packet;
host CPU of the target terminal;
host memory of the target terminal;
a connection table of the target terminal;
input/output times of the host of the target terminal; and
an input-output traffic proportion of the host of the target terminal.

For example, the quality of network service includes:
a network delay brought about in the process of cleaning the original data traffic;
a network packet loss rate brought about in the process of cleaning the original data traffic;
TCP availability brought about in the process of cleaning the original data traffic;
UDP availability brought about in the process of cleaning the original data traffic; and
jitter brought about in the process of cleaning the original data traffic.

A system for quantifying a defense result, including:
a service terminal, a defense terminal located in a cloud platform, a target terminal, and a core router connected to the service terminal, the defense terminal and the target terminal, wherein the core router is configured to copy original data traffic of the service terminal accessing the target terminal, to obtain copy data traffic; and the defense terminal is configured to acquire a suspect data traffic set, the suspect data traffic set including data traffic corresponding to each suspect IP address in a suspect IP address set included in original data traffic after the defense terminal located in the cloud platform draws through the core router the original data traffic of the service terminal accessing the target terminal, and the suspect IP address set being determined in the original data traffic according to a preset detection rule; acquire normal data traffic, the normal data traffic being data traffic that remains after the defense terminal cleans the suspect data traffic set according to a preset defense strategy; acquire host performance parameters, the host performance parameters being a set of parameters extracted from the target terminal after the defense terminal sends the normal data traffic to the target terminal; and quantify a defense result based on a target parameter set, wherein the target parameter set at least includes: the suspect data traffic set, the normal data traffic and the host performance parameters.

For example, the defense terminal includes:
a suspect traffic detection apparatus connected to the core router, configured to analyze the copy data traffic according to the preset detection rule to obtain a suspect IP address set included in the copy data traffic, and send the suspect IP address set;

a suspect traffic cleaning apparatus connected to the core router and the suspect traffic detection apparatus, configured to acquire the suspect IP address set, draw a suspect data traffic set in original data traffic of the core router, clean the suspect data traffic set according to the preset defense strategy, and forward normal data traffic that remains after the suspect data traffic set is cleaned to the target terminal; and a cloud host connected to the suspect traffic detection apparatus, the suspect traffic cleaning apparatus and the target terminal, configured to acquire the suspect data traffic set from the suspect traffic detection apparatus, the suspect data traffic set including suspect data traffic corresponding to each suspect IP address; acquire the normal data traffic from the suspect traffic cleaning apparatus, and acquire host performance parameters representing performance of the target terminal from the target terminal after sending the normal data traffic to the target terminal.

For example, the system further includes:

a service monitoring apparatus connected to the cloud host, configured to control multiple service hosts at different geographic locations to access the target terminal; calculate an access success rate according to a request success rate and a request delay fed back by the target terminal; and send the access success rate to the cloud host; and correspondingly, the target parameter set further includes the access success rate.

For example, the cloud host is further configured to calculate quality of network service according to the suspect data traffic set and the normal data traffic; and correspondingly, the target parameter set further includes the quality of network service.

For example, the core router is further configured to forward, to the target terminal, data traffic that remains after the suspect traffic cleaning apparatus draws the suspect data traffic set in the original data traffic.

For example, the cloud host is specifically configured to: determine change value sets of the parameters by using the target parameter set and a preset parameter set; match the change value sets of the parameters with respective parameter ranges in the expected SLA level; determine that a defense effect of the defense terminal reaches the expected SLA level if the matching succeeds; and determine that the defense effect of the defense terminal does not reach the expected SLA level if the matching fails.

For example, the cloud host is further configured to determine a previous defense strategy of the current defense strategy as the preset defense strategy if the matching fails, wherein the preset parameter set is a pre-stored set of parameters without any attack data traffic; the defense terminal stores multiple SLA levels arranged in order and a defense strategy corresponding to each SLA level, a smaller SLA level represents a higher service level enjoyed by the target terminal, and the defense strategy corresponding to a previous SLA level is superior to the defense strategy corresponding to a next SLA level.

For example, the host performance parameters include the quantity of half-open links after a host of the target terminal receives the first syn packet;

host CPU of the target terminal;

host memory of the target terminal;

a connection table of the target terminal;

input/output times of the host of the target terminal; and an input-output traffic proportion of the host of the target terminal.

For example, the quality of network service includes:

a network delay brought about in the process of cleaning the original data traffic;

a network packet loss rate brought about in the process of cleaning the original data traffic;

TCP availability brought about in the process of cleaning the original data traffic;

UDP availability brought about in the process of cleaning the original data traffic; and jitter brought about in the process of cleaning the original data traffic.

As shown from the above technical contents, the present disclosure has the following beneficial effects:

In the example embodiments of the present disclosure, a defense terminal is set in a cloud platform. The defense terminal in the cloud platform may draw original data traffic of a service terminal to itself. Services of a target terminal generally run on the cloud platform, and therefore the defense terminal may obtain data traffic of the target terminal from the cloud platform. Meanwhile, the defense terminal may also obtain its own data traffic. Therefore, data traffic of the service terminal, the target terminal, and the defense terminal may be centralized on the cloud platform, so that the data traffic of the three ends may be obtained. The present disclosure may centrally analyze the data traffic of the service terminal, the defense terminal and the target terminal. As such, the defense result may be evaluated from comprehensive aspects with comprehensive indexes, so that the defense result is relatively accurate.

BRIEF DESCRIPTION OF THE DRAWINGS

To illustrate the technical solutions in the example embodiments of the present disclosure or the conventional techniques more clearly, the accompanying drawings for describing the example embodiments or the conventional techniques will be introduced briefly. Apparently, the accompanying drawings in the following description only represent some example embodiments of the present disclosure. Those of ordinary skill in the art may further obtain other drawings according to these accompanying drawings without creative efforts.

DETAILED DESCRIPTION

The technical solutions in the example embodiments of the present disclosure will be described clearly and completely with reference to the accompanying drawings in the example embodiments of the present disclosure. It is apparent that, the example embodiments described are merely some of rather than all the example embodiments of the present disclosure. Based on the example embodiments in the present disclosure without paying creative efforts, all other example embodiments obtained by those of ordinary skill in the art should be encompassed in the protection scope of the present disclosure.

The fundamental reason for incomprehensive evaluation aspects and indexes in the defense result quantifying process in the conventional techniques lies in that data traffic of a service terminal, a defense terminal, and a target terminal cannot be centralized. Data traffic of an attack terminal comes from outside of a network. Data traffic of the defense terminal is generally at the boundary or exit of the network.

Data traffic of the target terminal is generally managed by the user. That is, the data traffic of the attack terminal, the defense terminal, and the target terminal is not in the same system. Moreover, there is no interface among the service terminal, the target terminal and the defense terminal; that is, data traffic of the three ends cannot be shared through interfaces. Therefore, it is difficult to centralize the data traffic.

Figure 1:
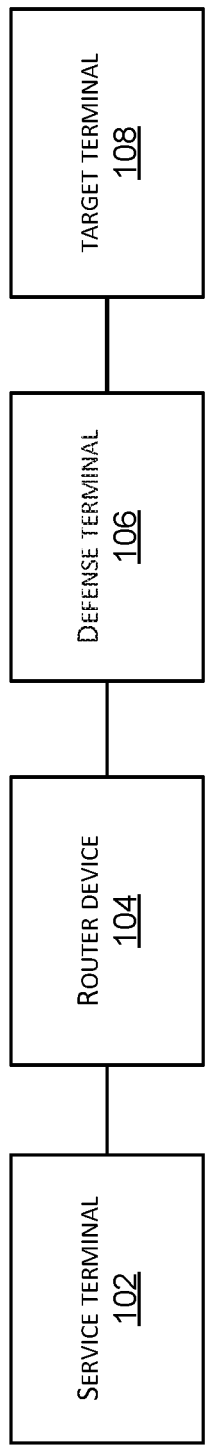
FIG. 1 is a schematic diagram of an existing network system architecture.
Figure 2:
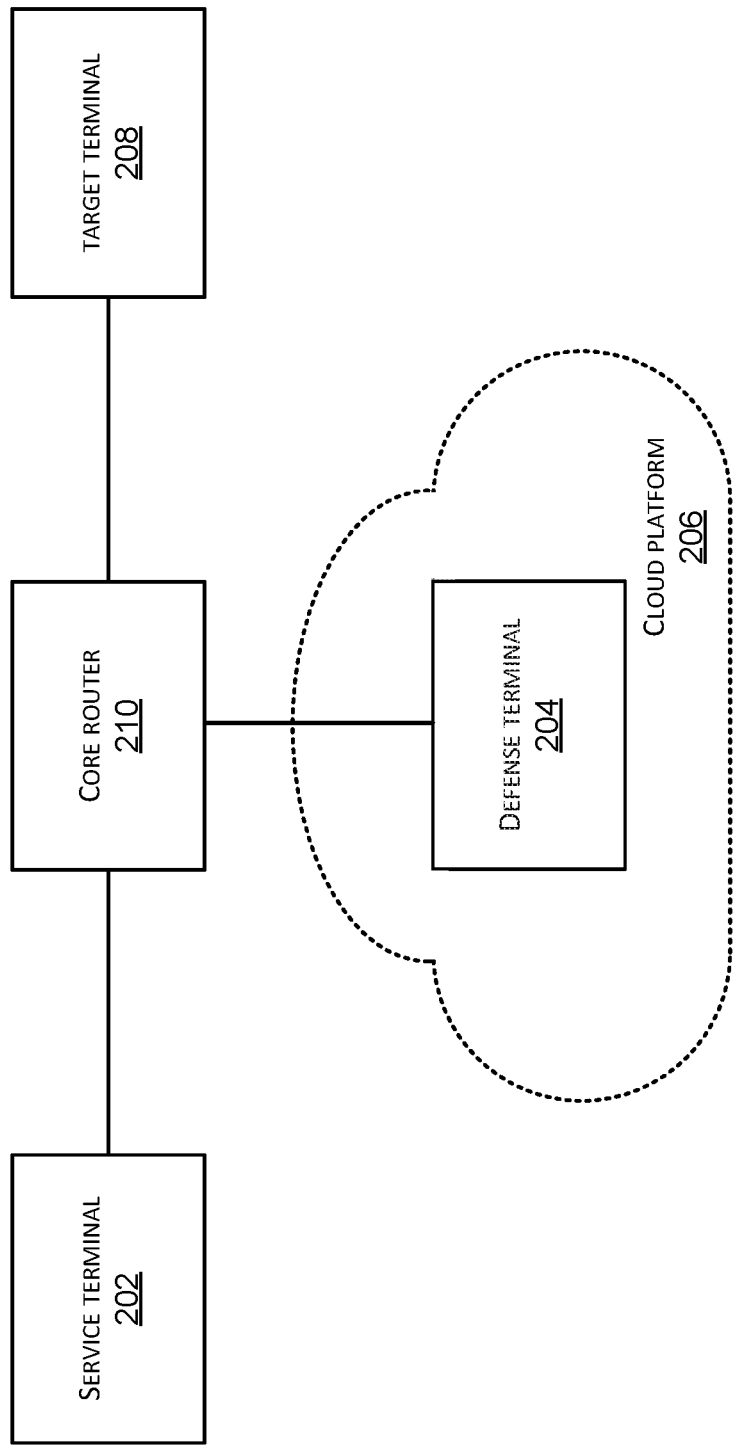
FIG. 2 is a schematic structural diagram of a system for quantifying a defense result according to an example embodiment of the present disclosure.

Therefore, the present disclosure provides a system for quantifying a defense result. As shown in FIG. 2, the system for quantifying a defense result includes: a service terminal 202, a defense terminal 204 located in a cloud platform 206, a target terminal 208, and a router such as a core router 210 connected to the service terminal 202, the defense terminal 204 and the target terminal 208. The defense terminal 204 in this example embodiment is disposed as a bypass on one side of the core router 210.

Functions of the parts in the system for quantifying a defense result are introduced in detail below.

(1) Service Terminal 202

The service terminal 202 in the present disclosure may include multiple service hosts. Each service host has a unique source address (IP address), and may send data traffic to the target terminal 208. Therefore, original data traffic sent by the service terminal 202 to the target terminal 208 may include data traffic sent by multiple service hosts. Each piece of data traffic includes a source address of a service host, that is, the original data traffic includes source addresses (IP addresses) of multiple service hosts.

Some of the service hosts are normal service hosts, and other service hosts are attack service hosts. Therefore, a part of the original data traffic is normal data traffic sent by the normal service hosts, and the rest is attack data traffic sent by the attack service hosts.

The service terminal 202 may send, to the core router 210, the original data traffic to be sent to the target terminal 208.

(2) Core Router 210

The core router 210 is configured to copy the original data traffic of the service terminal accessing the target terminal, to obtain copy data traffic.

The core router 210 may copy the original data traffic of the service terminal 202 accessing the target terminal 208 by using splitting with a splitter such as an optical splitter or by using software program replication, to obtain copy data traffic the same as the original data traffic. As such, the defense terminal 204 may conveniently detect the copy data traffic subsequently, to check whether the copy data traffic includes attack data traffic.

(3) Defense Terminal 204

Figure 3:
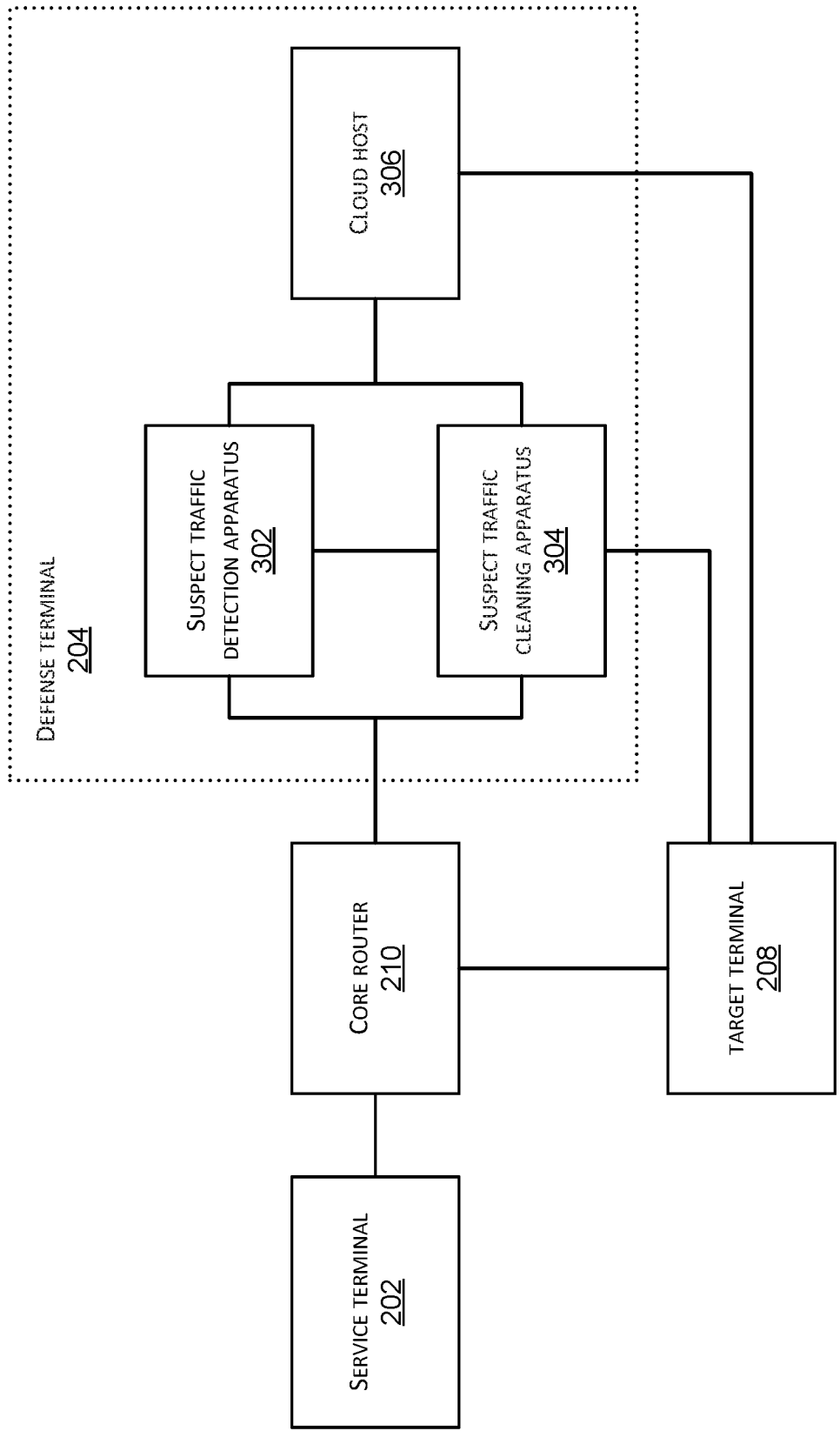
FIG. 3 is a schematic structural diagram of another system for quantifying a defense result according to an example embodiment of the present disclosure.

As shown in FIG. 3, the defense terminal 204 specifically includes the following apparatuses:

(a) Suspect Traffic Detection Apparatus 302.

The suspect traffic detection apparatus 302 is connected to the core router 210 and is configured to analyze the copy data traffic according to a preset detection rule, obtain a suspect IP address set included in the copy data traffic, and send the suspect IP address set.

The preset detection rule in the suspect traffic detection apparatus 302 may be multiple abnormal IP addresses that are aggressive. Data traffic sent from the suspect IP addresses may be aggressive suspect data traffic.

After obtaining the copy data traffic, the suspect traffic detection apparatus 302 may extract all IP addresses therefrom, and then may compare all the IP addresses with the abnormal IP addresses in the preset detection rule. When all the IP addresses in the copy data traffic include abnormal IP addresses, it indicates that the copy data traffic includes suspect data traffic.

All the abnormal IP addresses in the copy data traffic may be used as suspect IP addresses. A set of all the suspect IP addresses may be referred to as a suspect IP address set, and the suspect IP address set may be sent to a Suspect traffic cleaning apparatus 304.

Suspect data traffic corresponding to each suspect IP address may be extracted from the copy data traffic after the suspect IP address set is determined, and a set of all suspect data traffic is referred to as a suspect data traffic set. Moreover, the suspect data traffic set may be sent to a cloud host 306, so that the cloud host 306 may use the suspect data traffic set to calculate a defense result.

(b) Suspect Traffic Cleaning Apparatus 304.

The Suspect traffic cleaning apparatus 304 is connected to the core router 210 and the suspect traffic detection apparatus 302 and is configured to acquire the suspect IP address set, draw a suspect data traffic set in original data traffic of the core router 210, clean the suspect data traffic set according to a preset defense strategy, and forward, to the target terminal 208, normal data traffic that remains after the suspect data traffic set is cleaned.

The Suspect traffic cleaning apparatus 304 draws the suspect data traffic corresponding to each suspect IP address in the original data traffic of the core router 210 after obtaining the suspect IP address set, and uses a set of all the suspect data traffic as the suspect data traffic set.

The remaining data traffic after the suspect data traffic set is removed from the original data traffic is data traffic corresponding to non-aggressive IP addresses. Therefore, this part of data traffic does not need to be drawn to the Suspect traffic cleaning apparatus 304 for cleaning, but may be directly forwarded by the core router 210 to the target terminal 208.

The suspect data traffic set is data traffic transmitted from the suspect IP addresses. Therefore, the suspect data traffic in the suspect data traffic set may be normal data traffic or attack data traffic. Therefore, the Suspect traffic cleaning apparatus 304 needs to clean off the attack data traffic in the suspect data traffic set according to the preset defense strategy after obtaining the suspect data traffic set.

As may be seen, the suspect traffic cleaning apparatus 304 in the present disclosure only needs to clean the suspect data traffic set in the original data traffic, instead of cleaning all the original data traffic. The cleaning efficiency of the suspect traffic cleaning apparatus 304 may be improved as data traffic of the suspect traffic cleaning apparatus 203 is decreased.

Data traffic output by the Suspect traffic cleaning apparatus 304 after the cleaning is theoretically non-aggressive normal data traffic. Therefore, the normal data traffic may be forwarded to the target terminal 208. As such, the normal data traffic of the service terminal 202 accessing the target terminal 208 may be forwarded to the target terminal 208.

In reality, the preset defense strategy in the Suspect traffic cleaning apparatus 304 is not necessarily a defense strategy most suitable for the target terminal. That is, the data traffic obtained after the suspect data traffic set is cleaned according to the preset defense strategy may still include attack data traffic (in this case, it indicates that the defense strategy is too loose); or the original normal data traffic is cleaned off (in this case, it indicates that the defense strategy is too strict).

Therefore, the Suspect traffic cleaning apparatus 304 may send, to the cloud host 306, the remaining normal data traffic after the suspect data traffic set is cleaned, such that the cloud host 306 calculates a defense result, and improves the preset defense strategy according to the defense result.

(c) Cloud Host 306.

The cloud host 306 is connected to the suspect traffic detection apparatus 302, the Suspect traffic cleaning apparatus 304 and the target terminal 208 and is configured to acquire the suspect data traffic set from the suspect traffic detection apparatus 302, the suspect data traffic set including suspect data traffic corresponding to each suspect IP address; acquire the normal data traffic from the Suspect traffic cleaning apparatus 304, and acquire host performance parameters representing performance of the target terminal 208 from the target terminal 208 after sending the normal data traffic to the target terminal 208; and determine a target parameter set as a basis for quantifying the defense result, wherein the target parameter set at least includes the suspect data traffic set, the normal data traffic and the host performance parameters.

The cloud host 306 may acquire the suspect data traffic set from the suspect traffic detection apparatus 302, acquire from the Suspect traffic cleaning apparatus 304 the normal data traffic that remains after the cleaning according to the preset defense strategy, and calculate a change rate between the data traffic before and after the cleaning according to the suspect data traffic set and the normal data traffic. Moreover, the cloud host 306 may use the change rate as a basis for quantifying the defense result.

The normal data traffic obtained after the cleaning is sent to the target terminal 208. Therefore, the normal data traffic would directly affect the target terminal. That is, performance states of the target terminal 208 change first. For example, too much CPU is occupied, the target terminal is unable to respond, and so on. Therefore, host performance parameters of the target terminal may be extracted after the normal data traffic obtained after the cleaning is sent to the target terminal 208. The host performance parameters may be used as a basis for quantifying the defense result.

The host performance parameters include:

the quantity of half-open links after a host of the target terminal receives the first syn packet; host CPU of the target terminal; host memory of the target terminal; a connection table of the target terminal; input/output times of the host of the target terminal; and an input-output traffic proportion of the host of the target terminal.

In the system for quantifying a defense result provided in the present disclosure, the defense terminal 204 located in the cloud platform may draw original data traffic of the service terminal 202 to itself by using a routing and scheduling policy on the core router. Services of the target terminal 208 generally run on the cloud platform, and therefore the defense terminal 204 may obtain data traffic of the target terminal 208 from the cloud platform. Meanwhile, the defense terminal 204 located in the cloud platform may also obtain its own data traffic on the cloud platform. Therefore, data traffic of the service terminal 202, the target terminal 208, and the defense terminal 204 may be centralized on the cloud platform.

In addition, the data traffic of the service terminal 202, the target terminal 208, and the defense terminal 204 all passes through the cloud platform, and the cloud platform has a function of unifying data formats. Therefore, the cloud platform may unify data formats of the data traffic from the three ends, to facilitate uniform analysis on the data traffic of the three ends. Hence, the defense terminal 204 in the cloud platform may uniformly analyze the data traffic of the service terminal 202, the target terminal 208, and the defense terminal 204 simultaneously by using a big data analysis capability. An accurate defense result may be obtained because the defense result is quantified from comprehensive evaluation aspects with comprehensive indexes.

Figure 4:
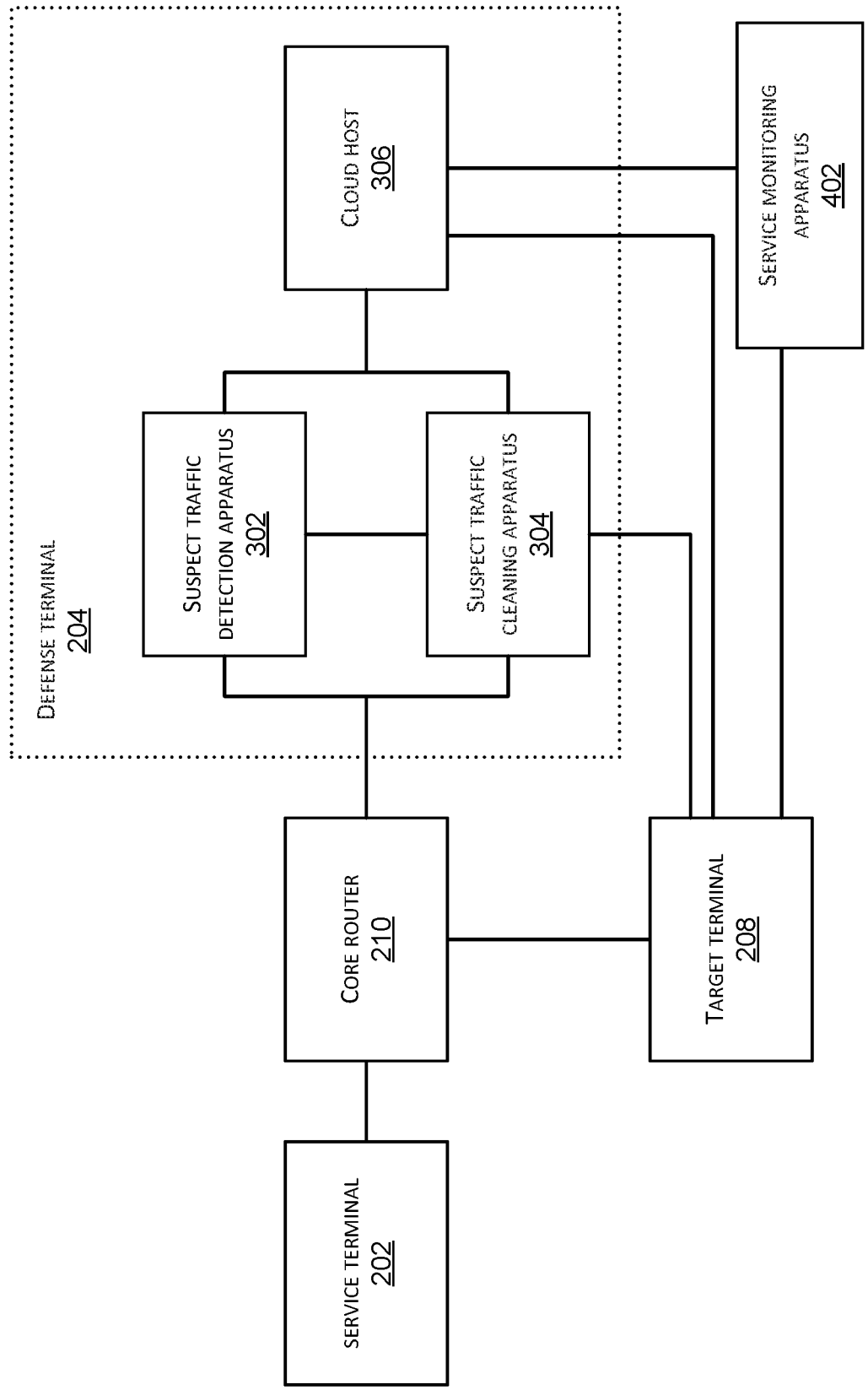
FIG. 4 is a schematic structural diagram of another system for quantifying a defense result according to an example embodiment of the present disclosure.

In order to make the defense result calculated by the cloud host 306 more accurate, as shown in FIG. 4, the system for quantifying a defense result provided in the present disclosure further includes:

a service monitoring apparatus 402 connected to the cloud host.

The service monitoring apparatus 402 is configured to control multiple service hosts at different geographic locations to access the target terminal 208, calculate an access success rate according to a request success rate and a request delay fed back by the target terminal 208, and send the access success rate to the cloud host 306. The access success rate may be used as one parameter in the target parameter set, such that the cloud host 306 calculates the defense result according to the access success rate.

After the Suspect traffic cleaning apparatus 304 sends the normal data traffic obtained after the cleaning to the target terminal 208, the normal data traffic (which possibly carries attack data traffic if the cleaning effect is undesirable) may affect normal operation of the target terminal. For example, assuming that the target terminal is "taobao.com", a user may fail to normally open the page of "taobao.com" after the normal data traffic is sent to the target terminal.

Therefore, the service monitoring apparatus 402 may control multiple service hosts at different locations to access the target terminal 208, to calculate the access success rate of the target terminal 208, to check whether the normal data traffic obtained after the cleaning affects normal services of the target terminal according to the access success rate.

For example, multiple service hosts at geographic locations such as Shenzhen, Beijing, Shanghai, and Guangzhou are controlled to access "taobao.com". Access success rates of the multiple service hosts are calculated according to whether the page of "taobao.com" may be opened or not and the speed of opening the page. Then, an average access success rate of the multiple service hosts is used as an access success rate of "taobao.com".

The obtained access success rate of the target terminal 208 may be used as one parameter in the target parameter set, such that the cloud host 306 calculates the defense result according to the access success rate.

In addition, the target parameter set for quantifying the defense result may further include: quality of network service.

The defense terminal 204 may cause the entire network to jitter in the process of cleaning the suspect data traffic set, resulting in a decline in the quality of network service, a decline in the access success rate of the target terminal 208, and a decline in the host performance parameters, affecting calculation of the defense result. Therefore, the cloud host 306 is further configured to calculate the quality of network service according to the suspect data traffic set and the normal data traffic, and use the quality of network service as one parameter in the target parameter set. As such, the cloud host 306 may take the quality of network service into consideration when calculating the defense result, so as to obtain a reasonable defense effect.

The quality of network service includes:

a network delay brought about in the process of cleaning the original data traffic;

a network packet loss rate brought about in the process of cleaning the original data traffic;

TCP availability brought about in the process of cleaning the original data traffic;

UDP availability brought about in the process of cleaning the original data traffic; and jitter brought about in the process of cleaning the original data traffic.

The system for quantifying a defense result shown in FIG. 2 to FIG. 4 is applicable to both optical networks and non-optical networks. Due to heavy data traffic in optical networks, the speed of replicating original traffic by using the core counter is slow. In order to accelerate the process of replicating the original data traffic, the present disclosure provides a system for quantifying a defense result applicable to optical networks.

Figure 5:
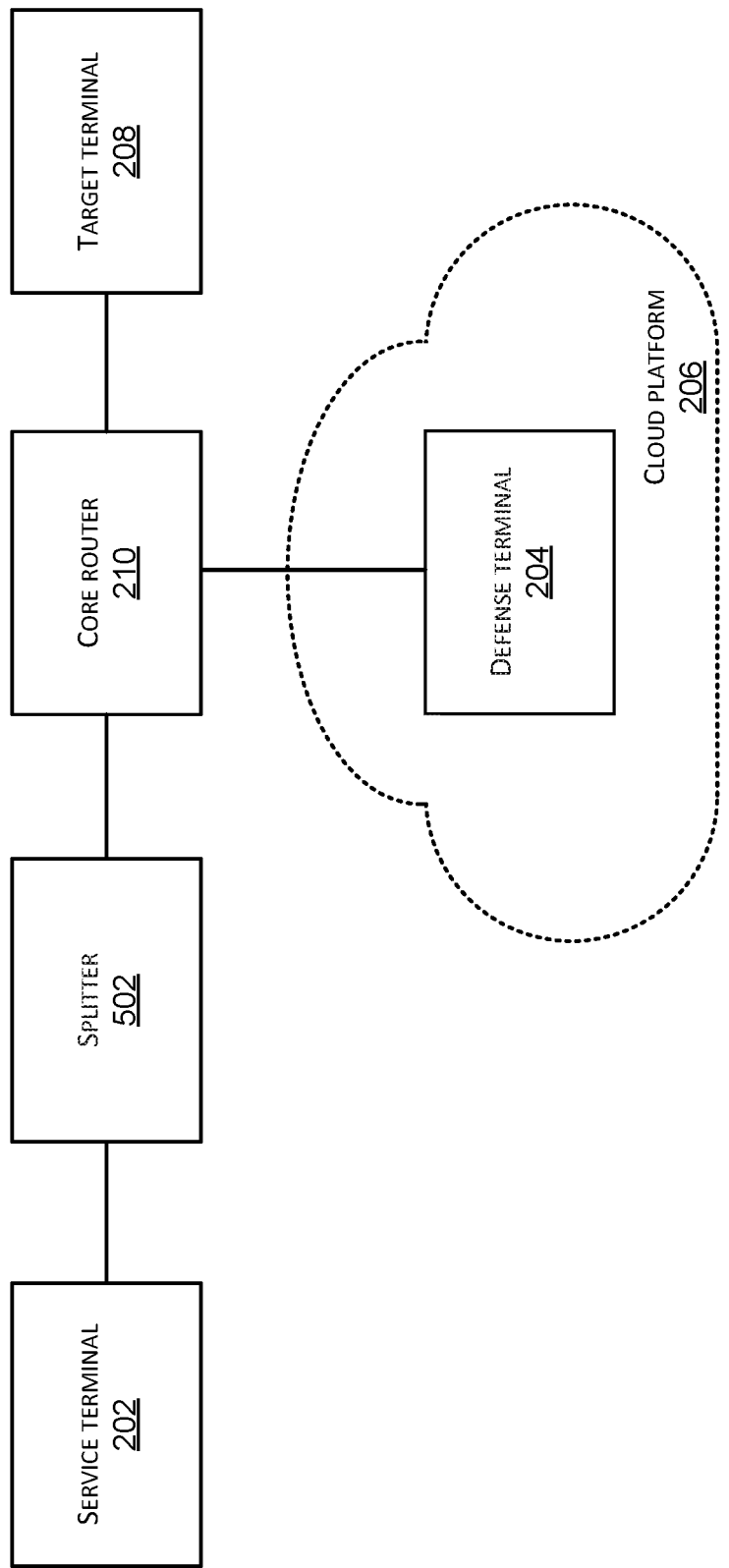
FIG. 5 is a schematic structural diagram of another system for quantifying a defense result according to an example embodiment of the present disclosure.

As shown in FIG. 5, the system for quantifying a defense result of the present disclosure includes:

a service terminal 202, a splitter 502 such as an optical splitter connected to the service terminal 202, a defense terminal 204 located in a cloud platform 206, a target terminal 208, and a core router 210 connected to the splitter 502, the defense terminal 204 and the target terminal 208. The defense terminal 204 in this example embodiment is disposed as a bypass on one side of the core router 210.

In this example embodiment, the splitter 502 may implement a process of replicating original traffic sent by the service terminal 202 to the target terminal 208 to obtain copy data traffic, and send the copy data traffic and the original data traffic to the core router 210. Other contents in this example embodiment are the same as those shown in FIG. 2 to FIG. 4, and are not described in detail again.

Figure 6:
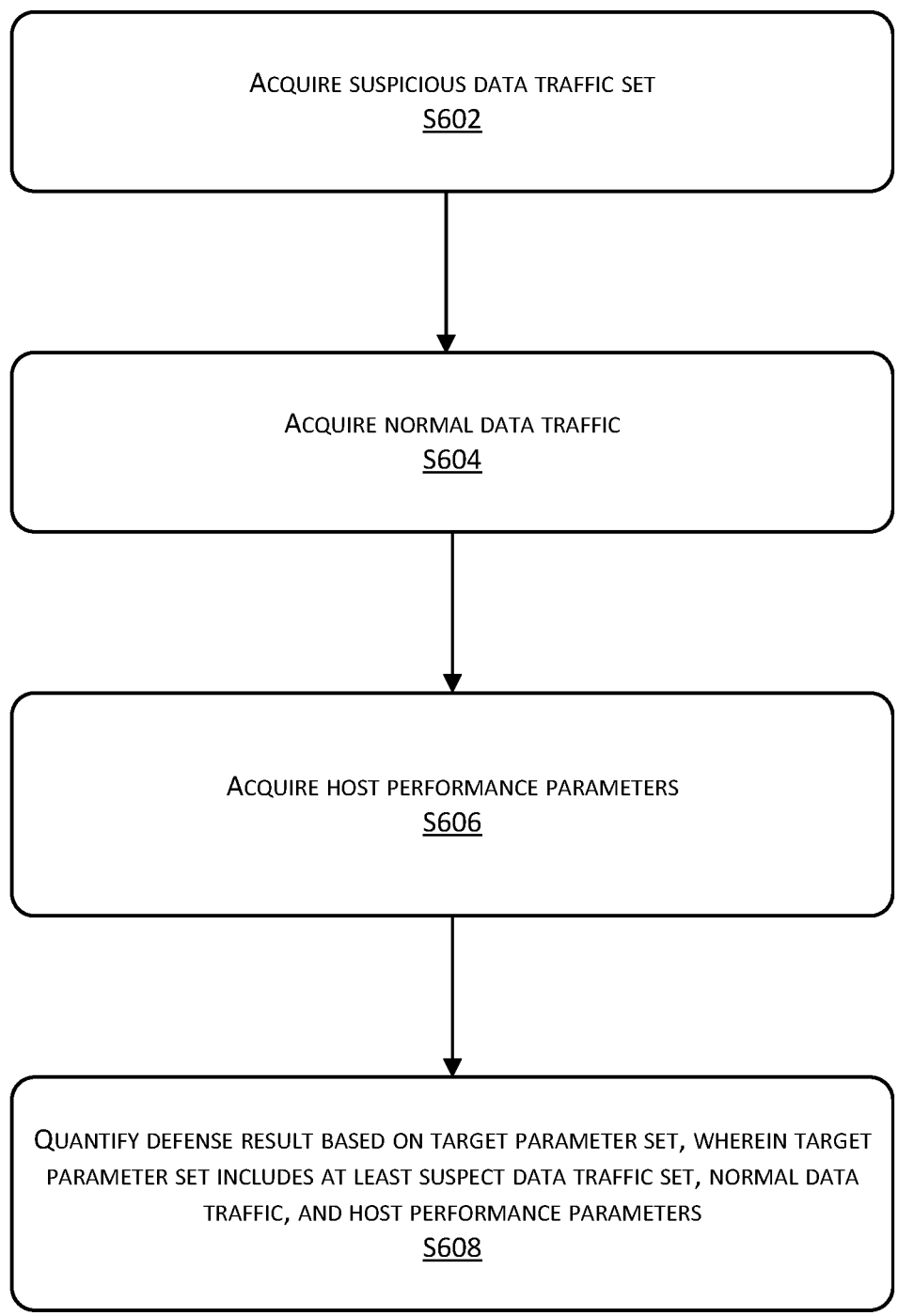
FIG. 6 is a flowchart of a method for quantifying a defense result according to an example embodiment of the present disclosure.

An example embodiment of a method for quantifying a defense result of the present disclosure is introduced below based on the system for quantifying a defense result shown in FIG. 2 to FIG. 5. This example embodiment is applied to the cloud host of the defense terminal in the system for quantifying a defense result. As shown in FIG. 6, the method may specifically include the following steps S602 to S608:

Step S602: A suspect data traffic set is acquired, wherein the suspect data traffic set consists of data traffic corresponding to each suspect IP address in a suspect IP address set included in original data traffic after a defense terminal located in a cloud platform draws through a core router the original data traffic of a service terminal accessing a target terminal, and the suspect IP address set is determined in the original data traffic according to a preset detection rule Step S604: Normal data traffic is acquired, wherein the normal data traffic is data traffic that remains after the defense terminal cleans the suspect data traffic set according to a preset defense strategy.

Step S606: Host performance parameters are acquired, wherein the host performance parameters are a set of parameters extracted from the target terminal after the defense terminal sends the normal data traffic to the target terminal.

Step S608: A defense result is quantified based on a target parameter set, wherein the target parameter set at least includes: the suspect data traffic set, the normal data traffic and the host performance parameters.

In addition, the target parameter set further includes the following parameters:

an access success rate sent by a service monitoring apparatus connected to the defense terminal, wherein the access success rate is calculated according to a request success rate and a request delay fed back by the target terminal after the service monitoring apparatus controls multiple service terminals at different geographic locations to access the target terminal; and quality of network service, which is calculated by the defense terminal according to the suspect data traffic set and the normal data traffic.

The process of acquiring the target parameter set by the cloud host of the defense terminal has been clearly illustrated in the example embodiment of the system for quantifying a defense result shown in FIG. 2 to FIG. 5, and is not described in detail again.

As may be seen, the present disclosure has the following beneficial effects:

In the example embodiment of the present disclosure, the defense terminal is set in the cloud platform. The defense terminal in the cloud platform may draw original data traffic of the service terminal to itself. Services of the target terminal generally run on the cloud platform, and therefore the defense terminal may obtain data traffic of the target terminal from the cloud platform. Meanwhile, the defense terminal may also obtain its own data traffic. Therefore, data traffic of the service terminal, the target terminal, and the defense terminal may be centralized on the cloud platform, so that the data traffic of the three ends may be obtained. The present disclosure may centrally analyze the data traffic of the service terminal, the defense terminal and the target terminal. As such, the defense result may be evaluated from comprehensive aspects with comprehensive indexes, so that the defense result is relatively accurate.

The defense result may be calculated after the target parameter set is obtained. Defense strategies and SLA levels used by a suspect traffic cleaning apparatus in the defense terminal are first illustrated before contents of the defense result calculation are introduced. The SLA is short for Service-Level Agreement. The SLA is a contract between a network service provider and a customer, and defines terminologies such as service type, quality of service, and customer payment.

The defense terminal may pre-store multiple defense strategies, and one defense strategy corresponds to one SLA level that should be reached theoretically. For example, a first SLA level corresponds to a first defense strategy, a second SLA level corresponds to a second defense strategy, a third SLA level corresponds to a third defense strategy, and so on. Moreover, the first SLA level, the second SLA level and the third SLA level are in descending order of quality of service for a user. Likewise, the first defense strategy, the second defense strategy and the third defense strategy are in descending order of strictness for attack traffic. That is, a stricter defense strategy corresponds to a better defense result, and a higher SLA level of the target terminal.

A user of the target terminal 208 may negotiate with the network service provider and set an expected SLA level of the target terminal 208 before the defense terminal is used to clean the original traffic. The network service provider will use a defense strategy corresponding to the expected SLA level as a preset defense strategy. The preset defense strategy may be used to block attack data traffic of the target terminal, so that a final defense result reaches the expected SLA level desired by the user.

In order to enable the target terminal to reach the expected SLA level, a preset defense strategy corresponding to the expected SLA level may be preset in the suspect traffic cleaning apparatus shown in FIG. 2. Theoretically, the defense strategy may enable the defense result to reach the corresponding expected SLA level. However, the constantly changing attack data traffic may break through the defense strategy and thus attack the target terminal, as a result the SLA level on the target terminal is lower than the expected SLA level.

Figure 7:
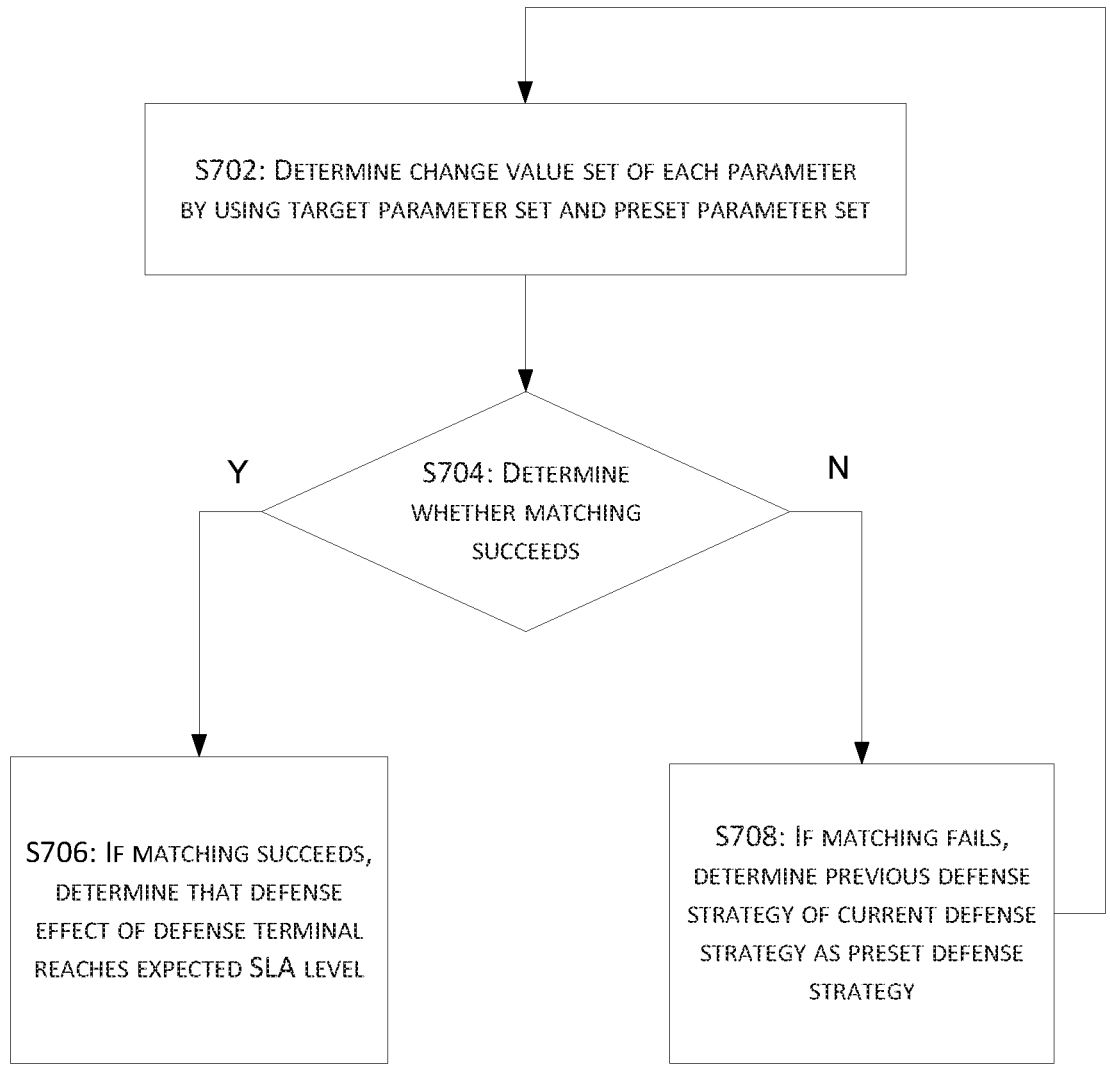
FIG. 7 is a flowchart of calculating a defense result in the method for quantifying a defense result according to an example embodiment of the present disclosure.

Therefore, whether the defense effect obtained by the target terminal reaches the expected SLA level may be calculated. As shown in FIG. 7, the calculation includes the following steps:

Step S702: Change value set of each parameter is determined by using the target parameter set and a preset parameter set, wherein the preset parameter set is a pre-stored set of parameters without any attack data traffic.

A detailed calculation process will be described after this example embodiment.

Step S704: Whether matching succeeds is determined. That is, the change value sets of the parameters are matched with respective parameter ranges in the expected SLA level, and whether the matching succeeds is determined.

The cloud host may store ranges of the parameters of each SLA level. Parameter change values calculated based on the target parameter set may be compared with parameter ranges of the expected SLA level.

Step S706: A defense effect of the defense terminal is determined to reach the expected SLA level if the matching succeeds.

If the change value sets of the parameters fall in the specified ranges of the expected SLA level, it indicates that the current defense effect reaches an expected defense effect. Data traffic accessing the target terminal may be cleaned continuously according to the preset defense strategy in the suspect traffic cleaning apparatus.

Step S708: A previous defense strategy of the current defense strategy is determined as the preset defense strategy if the matching fails; and step S702 is performed again. The defense terminal stores multiple SLA levels arranged in order and a defense strategy corresponding to each SLA level, a smaller SLA level represents a higher service level enjoyed by the target terminal, and the defense strategy corresponding to a previous SLA level is superior to the defense strategy corresponding to a next SLA level.

It may be determined that the defense effect of the defense terminal does not reach the expected SLA level if the matching fails. That is, if the change value sets of the parameters do not fall in the specified ranges of the expected SLA level, it may indicate that the current defense effect does not reach the expected defense effect, i.e., the preset defense strategy in the suspect traffic cleaning apparatus is too loose to reach the expected SLA level. Therefore, it is necessary to tighten up the defense strategy, such that the defense effect after the cleaning based on the defense strategy may reach the expected SLA level.

Therefore, a previous defense strategy of the current defense strategy may be determined as the preset defense strategy. Then, cleaning of data traffic accessing the target terminal may be continued based on the latest preset defense strategy. The defense result (the change value sets of the parameters) may be calculated according to the method of the present disclosure, and whether the defense result (the change value sets of the parameters) reaches the expected SLA level (respective parameter ranges of the expected SLA level) may be determined. If the defense result still fails to reach the expected SLA level, the defense strategy may be further tightened up. The process of calculating the defense result is repeated until the defense result reaches the expected SLA level.

Step S702 of determining change value sets of the parameters by using the target parameter set and a preset parameter set is described in detail below with reference to a specific application scenario.

(1) Traffic Performance Parameter

A variation set of a change rate between input protocol packets and output protocol packets is calculated according to the suspect data traffic set and the normal data traffic. The input protocol packets are extracted from the suspect data traffic set, and the output protocol packets are extracted from the normal data traffic.

Transmission between the service terminal and the target terminal is in a one-to-one mode. For example, if the service terminal sends a connection setup request to the target terminal, the target terminal sends a connection setup acknowledgment instruction to the service terminal. Therefore, the number of packets sent by the service terminal to the target terminal is supposed to be the same as the number of packets sent by the target terminal to the service terminal. When the number of output packets or input packets increases suddenly, it indicates that the cleaning effect of the defense terminal is undesirable.

This step is described in detail below by using three specific types of traffic attacks as examples.

(a) The Target Terminal is Under Syn Flood Attack.

In a normal case, the service terminal sends a syn (synchronize?) request packet to the target terminal, the target terminal feeds back a syn-ack (synchronize+acknowledgment) packet, and then the service terminal sends an ack (acknowledgment) packet to the target terminal, such that a connection between the service terminal and the target terminal is established.

When the target terminal is under syn flood attack (i.e., an attack terminal sends a large quantity of syn request packets to the target terminal), the number of syn-ack packets in the output direction will increase if the cleaning effect of the defense strategy is undesirable. However, the number of third ack packets sent by the service terminal will decrease.

Therefore, an increase rate $P_{syn}$ between syn packets before and after cleaning, and an increase rate $P_{syn\text{-}ack}$ between syn-ack packets before and after cleaning may be calculated.

$$P_{syn} = (pps_{syn} - pps'_{syn})/pps_{syn}$$

$$P_{syn\text{-}ack} = (pps_{syn\text{-}ack} - pps'_{syn\text{-}ack})/pps_{syn\text{-}ack}$$

$$P_1 = P_{syn} - P_{syn\text{-}ack}$$

wherein $pps_{syn}$ is the number of syn packets before cleaning based on the preset defense strategy, $pps'_{syn}$ is the number of syn packets after cleaning based on the preset defense strategy, $pps_{syn\text{-}ack}$ is the number of syn-ack packets before cleaning based on the preset defense strategy, $pps'_{syn}$ is the number of syn-ack packets after cleaning based on the preset defense strategy, and $P_1$ represents the defense result of the defense terminal.

In an ideal situation, a ratio of the number of syn packets in the input direction to the number of syn-ack packets in the output direction is 1:1, that is, $P_1=0$. Therefore, a greater value of $P_1$ represents that most of the syn packets in the input direction do not have responses, and indicates a poorer defense result.

(b) The Target Terminal is Under Ack Flood Attack.

In a normal case, the service terminal sends an ack (acknowledgment) request packet to the target terminal. The service terminal sends an rst (reset) packet to the target terminal when the target terminal determines that no connection to the service terminal is established. That is, the target terminal sends a reset packet to the service terminal if receiving a connection that apparently does not belong to the target terminal.

When the target terminal is under ack flood attack, the number of rst packets increases if the cleaning effect of the defense terminal is undesirable. Therefore, an increase rate $P_{ack}$ between ack packets before and after cleaning, and an increase rate $P_{rst}$ between rst packets before and after cleaning are calculated.

$$P_{ack}=(pps_{ack}-pps'_{ack})/pps_{ack}$$

$$P_{rst}=(pps_{rst}-pps'_{rst})/pps_{rst}$$

$$P_2=P_{ack}-P_{rst}$$

wherein $pps_{ack}$ is the number of ack packets before cleaning based on the preset defense strategy, $pps'_{ack}$ is the number of ack packets after cleaning based on the preset defense strategy, $pps_{rst}$ is the number of rst packets before cleaning based on the preset defense strategy, $pps'_{rst}$ is the number of rst packets after cleaning based on the preset defense strategy, and $P_2$ represents the defense result of the defense terminal.

In an ideal situation, a ratio of the number of ack packets in the input direction to the number of rst packets in the output direction is 1:1, that is, $P_2=0$. Therefore, a greater value of $P_2$ represents that most of the ack packets in the input direction do not have responses, and indicates a poorer defense result.

(c) The Target Terminal is Under icmp Flood Attack.

When the target terminal is under icmp flood attack, the number of icmp response packets will increase if the defense terminal is undesirable. Therefore, an increase rate $P_{icmp}$ between icmp packets before and after cleaning, and an increase rate $P_{icmp}$ response between icmp response packets before and after cleaning are calculated.

$$P_{icmp}=(pps_{icmp}-pps'_{icmp})/pps_{icmp}$$

$$P_{icmp-response}=(pps_{icmp-response}-pps'_{icmp-response})/pps_{icmp-response}$$

$$P_3=P_{icmp}-P_{icmp-response}$$

wherein $pps_{icmp}$ is the number of icmp packets before cleaning, $pps'_{icmp}$ is the number of icmp packets after cleaning, $pps_{icmp-response}$ is the number of icmp response packets before cleaning, $pps'_{icmp-response}$ is the number of icmp response packets after cleaning, and $P_3$ represents the defense result of the defense terminal.

In an ideal situation, a ratio of the number of icmp packets in the input direction to the number of icmp response packets in the output direction is 1:1, that is, $P_3=0$. Therefore, a greater value of $P_3$ represents that most of the icmp packets in the input direction do not have responses, and indicates a poorer defense result.

Three examples of calculating the proportion between input protocol packets and output protocol packets are listed above. It may be understood that, proportions of other types of traffic representing the defense result may be calculated to evaluate the defense result, which are not enumerated here.

This step is mainly used for evaluating the defense result of the traffic attack. The syn flood attack, ack flood attack, and icmp flood attack are all traffic attacks. Therefore, after the proportions ($P_1$, $P_2$ and $P_3$) for evaluating the defense result are obtained, an average of the multiple defense result proportions is used as an evaluated defense result of the traffic attack.

This step is mainly used for evaluating the defense result of the traffic attack. The syn flood attack is a typical traffic attack, and therefore $P_1$ may be directly used as the defense result of the traffic attack.

The traffic performance parameter may also be expressed as a standard deviation set between a core data set of the normal data traffic and a preset core data set of the preset parameter set.

This step evaluates whether a proportion of normal request packets to abnormal request packets meets the expectation by acquiring the proportion of request packets to corresponding response packets in real time and analyzing changes in http status codes.

A core data set that represents the normal data traffic may be calculated in the specific using process. The core data set includes a request response rate, a service success rate, a proportion of 30× status codes, a proportion of 40× status codes, a proportion of 50× status codes, and a delay of a normal user request.

The parameters in the core data set are described in detail below:

(a) Request Response Rate $P_{request}$ of a Site

A ratio of request packets to response packets at the target terminal changes constantly. Using a statistical period t as an example, http request packets and response packets both increase if an attack starts suddenly in a period of time from t1 to t2. The number of response packets for normal request packets is extremely small if the defense result of the defense terminal is undesirable. Therefore, statistics about the proportion of request packets to response packets are collected. The ratio of request packets to response packets will be lower than a limit value if the defense terminal has a poor cleaning effect.

$$P_{request}=C_{have\_response}/C_{request\_total}*100\%$$

wherein $P_{request}$ is a request response rate of a site, $C_{have\_response}$ is the number of response packets, and $C_{request\_total}$ is the total number of request packets.

(b) Proportion of 200 Ok Packets

A 200 ok packet represents that a service request succeeds, and $P_{200\_ok}$ represents the service success rate. The request response proportion $P_{request}$ may only measure the current network http traffic, while $P_{200\_ok}$ may reflect the probability of response to the service terminal.

$$P_{200ok}=C_{have\_200ok}/C_{have\_response}*100\%$$

wherein $C_{have\_200\_ok}$ represents packets indicating successful service requests, and $C_{have\_response}$ is the number of response packets.

(c) Proportions of Status Codes Such as 30×, 40×, and 50×

Status codes such as 30×, 40× and 50× would appear when packets in the normal data traffic are lost by mistake. Status codes of 40× and 50× errors may be generally returned when a large quantity of GET packets have no responses. Therefore, the proportions of status codes may be used to measure the condition of mistakenly killing normal data traffic during defense.

It should be noted that, some protection systems may use a human-machine recognition mechanism to determine whether a visitor is a real browser. For example, a 302 (30×) status code may be returned to determine whether a visitor is a program or a real browser according to a url redirect algorithm commonly used in the field. Therefore, a dramatic increase in 302 (30×) status codes in the network may also be used as an index for evaluating the defense result.

The three indexes above may be used to comprehensively measure a cleaning rate of CC attacks:

$$P_{30\times}=C_{have\_30\times}/C_{have\_response}*100\%$$

$$P_{40\times}=C_{have\_40\times}/C_{have\_response}*100\%$$

$$P_{50\times}=C_{have\_50\times}/C_{have\_response}*100\%$$

wherein $P_{30x}$ represents a proportion of 30x status codes in response packets, $C_{have\_30x}$ represents the number of 30x packets, $P_{40x}$ represents a proportion of 40x status codes in response packets, $C_{have\_40x}$ represents the number of 40x packets, $P_{50x}$ represents a proportion of 50x status codes in response packets, and $C_{have\_50x}$ represents the number of 50x packets.

(d) An RTT (Request Delay) of a Request of a Normal User: Assuming that the User Initiates a Total of n Requests During an Attack Period, an Average Delay of the User is Used as a Reference in Evaluation of the Current Attack Event.

$$T_0 = \sum_{1}^{n} RTT/n$$

(e) Determine a Core Data Set

A core data set M is constructed based on $P_{request}$, $P_{200ok}$, $P_{30x}$, $P_{40x}$, $P_{50x}$, and $T_0$ obtained through (a), (b), (c) and (d), wherein M defines data of core traffic indexes at the attack moment.

In order to determine the defense result more accurately, an array M of multiple core data sets may be calculated. For example, statistics about n core data sets are collected to form an array M. $M=\{M_1, M_2, \ldots M_i \ldots M_n\}$, wherein $M_i=\{P_{request}, P_{200ok}, P_{30x}, P_{40x}, P_{50x}, T_0\}$, and i=1, 2, ... n.

Another core data set N is obtained through history-based big data analysis on services in the cloud environment. That is, $N=\{P'_{request}, P'_{200ok}, P'_{30x}, P'_{40x}, P'_{50x}, T'_0\}$. N represents proportions of the indexes without any attack, i.e., a standard core data set.

These indexes do not fluctuate dramatically in an ideal situation. However, a particular index may change drastically when the defense strategy is unsatisfactory. For example, when a huge variation curve of 200ok status codes with respect to the historical average appears in an attack event, it indicates that the defense result is relatively poor and therefore responses to normal request packets decrease.

Therefore, the present disclosure employs a standard deviation to evaluate impact of the defense strategy on service indexes during an attack. The core data set N is used as an average, and then a standard deviation is calculated for each parameter. $P_{request}$ is used as an example to describe a standard deviation calculation formula in detail:

$$\sigma_{request} = \sqrt{\frac{1}{n}\sum_{1}^{n}(P_{request_i} - P'_{request})}$$

wherein $\sigma_{request}$ represents a standard deviation of $P_{request}$, $P_{requesti}$ is a value of the $i^{th}$ $P_{request}$, and n is the number of core data sets in the array M. $P'_{request}$ represents an average value in the core data set N.

Standard deviations of the array $M=\{M_1, M_2, \ldots M_i \ldots M_n\}$ with respect to each parameter in N may be calculated based on the foregoing method, to obtain multiple standard deviations $\sigma=\{\sigma_{request}, \sigma_{200ok}, \sigma_{30x}, \sigma_{40x}, \sigma_{50x}, \sigma_0\}$. A smaller standard deviation represents a better defense result, and a larger standard deviation represents a poorer defense result.

(2) Host Performance Parameters

A second change value set between the host performance parameters and preset host performance parameters in the preset parameter set are calculated.

Host performance parameters of the target terminal may be acquired after the normal data traffic obtained after the cleaning by the suspect traffic cleaning apparatus based on the preset defense strategy is sent to the target terminal. The state of a victim host changes first during a DDoS attack. Therefore, performance parameters of the victim host may be acquired to directly quantify impact of attack traffic on the host. It is more convenient to acquire the host performance parameters than monitoring changes in network traffic in some cases.

In a typical example, network traffic may be normal when a tcp slow connection occurs, but a lot of residual connections may be found by observing a connection table of a host of the target terminal. Therefore, the host performance parameters may be evaluated to serve as an important factor for measuring the defense terminal.

Referring to Table 1, the host performance parameters include: the quantity of half-open links after a host of the target terminal receives the first syn packet; host CPU of the target terminal; host memory of the target terminal; a connection table of the target terminal; input/output times of the host of the target terminal; and an input-output traffic proportion of the host of the target terminal.

TABLE 1

| Monitored index | Descriptions | Influencing attack type |
|---|---|---|
| syn receive change | The quantity of half-open links after the host receives the first syn packet | Syn flood |
| CPU | Change in host CPU | Syn flood, dns flood, cc |
| Memory | Change in host memory | Syn flood, cc, dns flood |
| Connection table | Increase in the connection table of the host | Tcp connection Slow connection |
| IO | IO times of the host | Database attack, cc |
| Traffic proportion | Input-output traffic proportion of the host | Changes in the traffic proportion are different under different attacks |

(3) Access Success Rate

A third change value set between the access success rate and a preset access success rate in the preset parameter set is calculated.

The access success rate may include a request success rate and a request delay. Then, a change rate between the request success rate and the preset access success rate, and a variation between the request delay and the preset request delay may be calculated and used as the third change value set.

Attack traffic may affect the target terminal, and further affect service performance of the target terminal. In order to determine current service performance (capability of normally responding to normal service requests) of the target terminal, the example embodiment of the present disclosure may control a normal service terminal to access the target terminal. A change rate of the request success rate and a variation in the request delay may be calculated to determine impact of the attack data traffic on the target terminal. This may reflect the quality of the defense result.

(4) Quality of Network Service

A fourth change value set between the quality of network service and preset quality of network service in the preset parameter set is calculated.

A defense strategy for a host under attack may affect the whole network state in distributed environments. Consequently, other hosts not attacked would also be affected.

Therefore, overall network performance parameters also need to be used as evaluation criteria during evaluation of the defense success rate.

Referring to Table 2, the network environment parameters include: a network delay brought about in the process of cleaning the original data traffic; a network packet loss rate brought about in the process of cleaning the original data traffic; TCP availability brought about in the process of cleaning the original data traffic; UDP availability brought about in the process of cleaning the original data traffic; and jitter brought about in the process of cleaning the original data traffic.

TABLE 2

| Monitored parameter | Descriptions |
| --- | --- |
| Network delay | A delay increase brought about in the DDos cleaning process |
| Network packet loss rate | A packet loss increase rate brought about in the DDos cleaning process |
| TCP availability | A decrease rate in new tcp connections brought about in the DDos cleaning process |
| UDP availability | A udp bandwidth utilization rate brought about in the DDos cleaning process |
| Jitter | A jitter variation brought about in the DDos cleaning process |

A specific process of matching the change value sets of the parameters calculated according to the target parameter set and the respective parameter ranges in the expected SLA level is introduced below, to evaluate whether the defense result meets the final expected SLA level of the user.

First: Traffic Performance Parameters

Changes in network traffic are different under different DDoS attacks. In order to quantify the influence of the DDoS defense terminal from the perspective of traffic, SLA indexes of a key protocol packet in the network are defined in the present disclosure, as shown Table 3. For example, an upper limit of a TCP retransmission rate is defined, and when the retransmission rate is higher than a certain upper limit, it indicates that the defense result does not reach the expected SLA level.

TABLE 3

| Monitored parameter | Range | Descriptions |
| --- | --- | --- |
| In/out traffic proportion | <5% | Change rate of the in/out traffic proportion with respect to the historical average |
| TCP retransmission rate | <5% | Retransmission rate = number of retransmitted packets/total number of packets<br>Out-of-order rate = sum (fast retransmission + Retransmission)/sum (total) |
| TCP packet loss rate, out-of-order rate | <5% | Packet loss rate = number of lost packets/total number of packets<br>Packet loss rate = sum (previous segment lost + ack lost segment)/sum (packet total)<br>Out-of-order rate = number of out-of-order packets/total number of packets<br>Out-of-order rate = sum (out-of-order)/sum (total) |
| UDP retransmission rate | <5% | Retransmission rate = number of retransmitted packets/total number of packets<br>Out-of-order rate = sum (fast retransmission + Retransmission)/sum (total) |
| UDP packet loss rate | <5% | Packet loss rate = number of lost packets/total number of packets<br>Packet loss rate = sum (previous segment lost + ack lost segment)/sum (packet total) |
| TCP FIN/RST packet increase rate | <5% | An increase rate of a fin/rst proportion in TCP traffic to that when there is no attack |
| Increase of other packets in out direction Psyn-ack, Picmp, Picmp-response | <5% | A proportion of syn-ack packets, a proportion of icmp unreachable packets, and a proportion of icmp response packets in the out direction |

Second: Access Success Rate (Request Success Rate and Request Delay)

This includes a set of service performance indexes that an application server needs to meet. Therefore, it may be determined whether service performance indexes in Table 4 below are met to evaluate whether the DDoS defense result meets the expected SLA of the user.

TABLE 4

| Type | One-way delay | Request response delay | Packet loss rate |
| --- | --- | --- | --- |
| WEB | N/A | RTT < 4 s | <3% |
| FTP | N/A | RTT < 10 s | <3% |
| FPS games | <150 ms | N/A | <3% |
| RTS games | <500 ms | N/A | <3% |
| telnet | N/A | RTT < 250 ms | N/A |
| e-mail | N/A | Total time < 4 h | N/A |
| Usenet | N/A | Total time < 4 h | N/A |
| Chat | <30 s | N/A | N/A |
| ICMP | N/A | RTT < 4 s | N/A |
| DNS | N/A | Total time < 4 s | N/A |
| Audio, conv | <150 ms | RTT < 4 s | <3% |
| Audio, messg | <2 s | RTT < 4 s | <3% |
| Audio, stream | <10 s | RTT < 4 s | <1% |
| Videophone | <150 ms | RTT < 4 s | <3% |
| video, stream | <10 s | RTT < 4 s | <1% |

Third: Host Performance Parameters

The status of the host is fed back, and it is determined whether indexes of the current host SLA are met based on different attack types. Table 5 shows parameters representing the status of the host.

TABLE 5

| Monitored index | Range |
| --- | --- |
| Host status-syn receive change | Half-open link increase <5% |
| Host status-cpu | CPU increase <5% |
| Host status-memory | Memory increase <5% |
| Host status-connection table | Connection table increase of the host <5% |
| Host status-io | IO times of the host <5% |
| Host status-traffic proportion | <max (host bandwidth) |

Fourth: Quality of Network Service

A defense strategy for a host under attack may affect the whole network state in distributed environments. Consequently, other hosts not attacked would also be affected. Therefore, overall quality of network service also needs to be used as an evaluation criterion during evaluation of the defense success rate. Referring to Table 6, the following key core indexes are defined to represent SLA parameters in this dimension.

TABLE 6

| Monitored parameter | Range | Descriptions |
| --- | --- | --- |
| Network delay | <10 ms | A delay increase brought about in the DDos cleaning process |
| Network packet loss rate | <0.1% | A packet loss increase rate brought about in the DDos cleaning process |
| TCP availability | <0.1% | A decrease rate in new tcp connections brought about in the DDos cleaning process |
| UDP availability | <0.1% | A udp bandwidth utilization rate brought about in the DDos cleaning process |
| Jitter | <0.1% | A jitter variation brought about in the DDos cleaning process |

It may be determined whether the change value sets of the parameters are in respective parameter ranges of the expected SLA level according to the above specified ranges of the parameter indexes of the expected SLA level. It is determined that the defense effect of the defense strategy reaches the expected SLA level if the change value sets of the parameters are in respective parameter ranges of the expected SLA level; otherwise, it indicates that the defense effect of the defense strategy does not reach the expected SLA level.

All the contents provided by the present disclosure are described above. It may be learned from the above technical solution that:

In the example embodiments of the present disclosure, a defense terminal is set in a cloud platform. The defense terminal in the cloud platform may draw original data traffic of a service terminal to itself. Services of a target terminal generally run on the cloud platform, and therefore the defense terminal may obtain data traffic of the target terminal from the cloud platform. Meanwhile, the defense terminal may also obtain its own data traffic. Therefore, data traffic of the service terminal, the target terminal, and the defense terminal may be centralized on the cloud platform, so that the data traffic of the three ends may be obtained. The present disclosure may centrally analyze the data traffic of the service terminal, the defense terminal and the target terminal. As such, the defense result may be evaluated from comprehensive aspects with comprehensive indexes, so that the defense result is relatively accurate.

When implemented as software functional units and sold or used as an independent product, the functions of the method in this example embodiment may be stored in a storage medium accessible to a computer device. Based on such an understanding, a part of the example embodiments of the present disclosure that makes contribution to the conventional techniques or a part of the technical solution may be embodied as a software product. The software product is stored in a storage medium and includes several instructions to cause a computing device (which may be a personal computer, a server, a mobile computing device, a network device, or the like) to execute all or some steps in the methods in the example embodiments of the present disclosure. The foregoing storage medium includes various media capable of storing program code, such as a USB flash drive, a removable hard disk, a read-only memory (ROM), a random access memory (RAM), a magnetic disk, or an optical disc.

The apparatuses, terminals, devices, and hosts described herein includes one or more processor(s) or data processing unit(s) and memory. The apparatuses, terminals, devices, and hosts may further include one or more input/output interface(s) and one or more network interface(s). The memory is an example of computer readable media.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include non-transitory transitory media such as modulated data signals and carriers.

The memory may store therein a plurality of modules, units, or computer-readable instructions to perform methods or processes described herein.

The example embodiments in the specification are described progressively. Each example embodiment emphasizes a part different from other example embodiments. Identical or similar parts of the example embodiments may be obtained with reference to each other.

The above descriptions about the disclosed example embodiments enable those skilled in the art to implement or use the present disclosure. Various modifications on these example embodiments are obvious to those skilled in the art. General principles defined in the specification may be implemented in other example embodiments without departing from the spirit or scope of the present disclosure. Therefore, the present disclosure will not be limited by the example embodiments depicted in the specification, and should meet the broadest scope consistent with the principle and novelty disclosed in the specification.

The present disclosure may further be understood with clauses as follows.

Clause 1. A method for quantifying a defense result comprising:

acquiring a suspect data traffic set, the suspect data traffic set including data traffic corresponding to each suspect IP address in a suspect IP address set included in original data traffic after a defense terminal located in a cloud platform draws through a core router the original data traffic of a service terminal accessing a target terminal, and the suspect IP address set being determined in the original data traffic according to a preset detection rule;

acquiring normal data traffic, the normal data traffic being data traffic that remains after the defense terminal cleans the suspect data traffic set according to a preset defense strategy;

acquiring host performance parameters, the host performance parameters being a set of parameters extracted from the target terminal after the defense terminal sends the normal data traffic to the target terminal; and quantifying the defense result based on a target parameter set, the target parameter set including at least the suspect data traffic set, the normal data traffic, and the host performance parameters.

Clause 2. The method of clause 1, wherein the target parameter set further includes:

an access success rate sent by a service monitoring apparatus connected to the defense terminal, wherein the access success rate is calculated according to a request success rate and a request delay fed back by the target terminal after the service monitoring apparatus controls multiple service terminals at different geographic locations to access the target terminal.

Clause 3. The method of clause 2, wherein the target parameter set further includes a quality of network service that is calculated by the defense terminal according to the suspect data traffic set and the normal data traffic.

Clause 4. The method of any of clauses 1 to 3, wherein:
the preset defense strategy in the suspect traffic cleaning apparatus corresponds to an expected SLA level; and
the quantifying the defense result based on the target parameter set includes:
determining change value sets of the parameters by using the target parameter set and a preset parameter set, wherein the preset parameter set is a pre-stored set of parameters without any attack data traffic;
matching the change value sets of the parameters with respective parameter ranges in the expected SLA level;
determining that a defense effect of the defense terminal reaches the expected SLA level if the matching succeeds; and
determining that the defense effect of the defense terminal does not reach the expected SLA level if the matching fails.

Clause 5. The method of clause 4, further comprising:
determining a previous defense strategy of the current defense strategy as the preset defense strategy if the matching fails,
wherein:
the defense terminal stores multiple SLA levels arranged in order and a defense strategy corresponding to each SLA level;
a smaller SLA level represents a higher service level enjoyed by the target terminal; and
a defense strategy corresponding to a previous SLA level is superior to a defense strategy corresponding to a next SLA level.

Clause 6. The method of clause 4, wherein the determining the change value sets of the parameters by using the target parameter set and the preset parameter set includes:
calculating a variation set of a change rate between input protocol packets and output protocol packets according to the suspect data traffic set and the normal data traffic, wherein the input protocol packets are extracted from the suspect data traffic set, and the output protocol packets are extracted from the normal data traffic; and
calculating a standard deviation set between a core data set of the normal data traffic and a preset core data set of the preset parameter set, wherein the core data set includes a request response rate, a service success rate, a proportion of 30× status codes, a proportion of 40× status codes, a proportion of 50× status codes, and a delay of a normal user request; and
calculating a second change value set between the host performance parameters and preset host performance parameters in the preset parameter set; and/or
calculating a third change value set between the access success rate and a preset access success rate in the preset parameter set; and/or
calculating a fourth change value set between the quality of network service and preset quality of network service in the preset parameter set.

Clause 7. The method of clause 6, wherein the calculating the variation set of the change rate between input protocol packets and output protocol packets according to the suspect data traffic set and the normal data traffic includes:
calculating a difference between a syn packet in an input direction and a syn packet in an output direction, and using a ratio of the difference to the syn packet in the input direction as an increase rate of the syn packet;
calculating a difference between an syn-ack packets in the input direction and a syn-ack packet in the output direction, and using a ratio of the difference to the syn-ack packets in the input direction as an increase rate of the syn-ack packets; and
determining a difference between the increase rate of the syn packets and the increase rate of the syn-ack packets as the variation set.

Clause 8. The method of clause 6, wherein the calculating the standard deviation set between the core data set of the normal data traffic and the preset core data set of the preset parameter set includes:
calculating a first standard deviation corresponding to the request response rates, a second standard deviation corresponding to the service success rates, a third standard deviation corresponding to the proportions of 30× status codes, a fourth standard deviation corresponding to the proportions of 40× status codes, a fifth standard deviation corresponding to the proportions of 50× status codes, and a sixth standard deviation corresponding to the delays of a normal user request in the core data set and the preset core data set; and
determining a set including the first standard deviation, the second standard deviation, the third standard deviation, the fourth standard deviation, the fifth standard deviation and the sixth standard deviation as the standard deviation set.

Clause 9. The method of clause 6, wherein:
the access success rate includes a request success rate and a request delay; and
the calculating the third change value set between the access success rate and the preset access success rate in the preset parameter set includes:
calculating a change rate between the request success rate in the access success rate and the request success rate in the preset access success rate;
calculating a variation between the request delay in the access success rate and the request delay in the preset access success rate; and
determining the change rate and the variation as the third change value set.

Clause 10. The method of clause 1 or 6, wherein the host performance parameters include:
a quantity of half-open links after a host of the target terminal receives the first syn packet;
a host CPU of the target terminal;
a host memory of the target terminal;
a connection table of the target terminal;
input/output times of the host of the target terminal; and
an input-output traffic proportion of the host of the target terminal.

Clause 11. The method of clause 3 or 6, wherein the quality of network service includes:
a network delay brought about in a process of cleaning the original data traffic;
a network packet loss rate brought about in a process of cleaning the original data traffic;
TCP availability brought about in a process of cleaning the original data traffic;
UDP availability brought about in a process of cleaning the original data traffic; and
jitter brought about in a process of cleaning the original data traffic.

Clause 12. A system for quantifying a defense result comprising:

a service terminal, a defense terminal located in a cloud platform, a target terminal, and a core router connected to the service terminal, the defense terminal and the target terminal, wherein:

the core router copies original data traffic of the service terminal accessing the target terminal to obtain copy data traffic; and the defense terminal acquires a suspect data traffic set, the suspect data traffic set including data traffic corresponding to each suspect IP address in a suspect IP address set comprised in original data traffic after the defense terminal located in the cloud platform draws through the core router the original data traffic of the service terminal accessing the target terminal, and the suspect IP address set being determined in the original data traffic according to a preset detection rule; acquires normal data traffic, the normal data traffic being data traffic that remains after the defense terminal cleans the suspect data traffic set according to a preset defense strategy; acquires host performance parameters, the host performance parameters being a set of parameters extracted from the target terminal after the defense terminal sends the normal data traffic to the target terminal; and quantifies a defense result based on a target parameter set, the target parameter set including at least the suspect data traffic set, the normal data traffic, and the host performance parameters.

Clause 13. The system of clause 12, wherein the defense terminal includes:

a suspect traffic detection apparatus, connected to the core router, that analyzes the copy data traffic according to the preset detection rule to obtain the suspect IP address set included in the copy data traffic, and send the suspect IP address set;

a suspect traffic cleaning apparatus, connected to the core router and the suspect traffic detection apparatus, that acquires the suspect IP address set, draws a suspect data traffic set in original data traffic of the core router, cleans the suspect data traffic set according to the preset defense strategy, and forwards normal data traffic that remains after the suspect data traffic set is cleaned to the target terminal; and a cloud host, connected to the suspect traffic detection apparatus, the suspect traffic cleaning apparatus and the target terminal, that acquires the suspect data traffic set from the suspect traffic detection apparatus, the suspect data traffic set including suspect data traffic corresponding to each suspect IP address; acquires the normal data traffic from the suspect traffic cleaning apparatus, and acquires host performance parameters representing performance of the target terminal from the target terminal after sending the normal data traffic to the target terminal.

Clause 14. The system of clause 13, further comprising:

a service monitoring apparatus, connected to the cloud host, that controls multiple service hosts at different geographic locations to access the target terminal; calculates an access success rate according to a request success rate and a request delay fed back by the target terminal; and sends the access success rate to the cloud host; and correspondingly, the target parameter set further includes the access success rate.

Clause 15. The system of clause 13, wherein:

the cloud host further calculates a quality of network service according to the suspect data traffic set and the normal data traffic; and correspondingly, the target parameter set further includes the quality of network service.

Clause 16. The system of clause 13, wherein:

the core router further forwards, to the target terminal, data traffic that remains after the suspect traffic cleaning apparatus draws the suspect data traffic set in the original data traffic.

Clause 17. The system of any of clauses 13 to 15, wherein:

the cloud host determines change value sets of the parameters by using the target parameter set and a preset parameter set; matches the change value sets of the parameters with respective parameter ranges in an expected SLA level; determines that a defense effect of the defense terminal reaches the expected SLA level if the matching succeeds; and determines that the defense effect of the defense terminal does not reach the expected SLA level if the matching fails.

Clause 18. The system of clause 17, wherein:

the cloud host further determines a previous defense strategy of the current defense strategy as the preset defense strategy if the matching fails, wherein:

the preset parameter set is a pre-stored set of parameters without any attack data traffic;

the defense terminal stores multiple SLA levels arranged in order and a defense strategy corresponding to each SLA level;

a smaller SLA level represents a higher service level enjoyed by the target terminal; and a defense strategy corresponding to a previous SLA level is superior to a defense strategy corresponding to a next SLA level.

Clause 19. The system of clause 12, wherein the host performance parameters include:

a quantity of half-open links after a host of the target terminal receives the first syn packet;

a host CPU of the target terminal;

a host memory of the target terminal;

a connection table of the target terminal;

input/output times of the host of the target terminal; and an input-output traffic proportion of the host of the target terminal.

Clause 20. The system of clause 15, wherein the quality of network service includes:

a network delay brought about in a process of cleaning the original data traffic;

a network packet loss rate brought about in a process of cleaning the original data traffic;

TCP availability brought about in a process of cleaning the original data traffic;

UDP availability brought about in a process of cleaning the original data traffic; and jitter brought about in a process of cleaning the original data traffic.

What is claimed is:

1. A method comprising:

acquiring a suspect data traffic set, the suspect data traffic set including data traffic corresponding to one or more suspect IP addresses in a suspect IP address set included in original data traffic;

acquiring normal data traffic, the normal data traffic being data traffic that remains after the suspect data traffic set is cleaned according to a preset defense strategy, the preset defense strategy corresponding to an expected service level agreement (SLA) level;

acquiring host performance parameters, the host performance parameters being a set of parameters extracted from a target terminal to where the normal data traffic is sent; and quantifying a defense result at least based on a target parameter set, the target parameter set including at least the suspect data traffic set, the normal data traffic, and the host performance parameters, the quantifying the defense result based on the target parameter set includes:

determining change value sets of the parameters by using the target parameter set and a preset parameter set, wherein the preset parameter set is a pre-stored set of parameters without any attack data traffic;

matching the change value sets of the parameters with respective parameter ranges in the expected SLA level;

determining that a defense effect of a defense terminal reaches the expected SLA level if the matching succeeds; and determining that the defense effect of the defense terminal does not reach the expected SLA level if the matching fails.

2. The method of claim 1, wherein the target parameter set further includes:

an access success rate sent by a service monitoring apparatus connected to a defense terminal, wherein the access success rate is calculated according to a request success rate and a request delay fed back by the target terminal after the service monitoring apparatus controls multiple service terminals at different geographic locations to access the target terminal.

3. The method of claim 2, wherein the target parameter set further includes a quality of network service that is calculated by the defense terminal according to the suspect data traffic set and the normal data traffic.

4. The method of claim 3, wherein the quality of network service includes:

a network delay brought about in a process of cleaning the original data traffic;

a network packet loss rate brought about in a process of cleaning the original data traffic;

TCP availability brought about in a process of cleaning the original data traffic;

UDP availability brought about in a process of cleaning the original data traffic; and jitter brought about in a process of cleaning the original data traffic.

5. The method of claim 1, further comprising:

determining a previous defense strategy of a current defense strategy as the preset defense strategy if the matching fails, wherein:

the defense terminal stores multiple SLA levels arranged in order and a defense strategy corresponding to each SLA level;

a smaller SLA level represents a higher service level enjoyed by the target terminal; and a defense strategy corresponding to a previous SLA level is superior to a defense strategy corresponding to a next SLA level.

6. The method of claim 1, wherein the determining the change value sets of the parameters by using the target parameter set and the preset parameter set includes:

calculating a variation set of a change rate between input protocol packets and output protocol packets according to the suspect data traffic set and the normal data traffic, wherein the input protocol packets are extracted from the suspect data traffic set, and the output protocol packets are extracted from the normal data traffic;

calculating a standard deviation set between a core data set of the normal data traffic and a preset core data set of the preset parameter set, wherein the core data set includes a request response rate, a service success rate, a proportion of 30× status codes, a proportion of 40× status codes, a proportion of 50× status codes, and a delay of a normal user request;

calculating a second change value set between the host performance parameters and preset host performance parameters in the preset parameter set;

calculating a third change value set between the access success rate and a preset access success rate in the preset parameter set; and calculating a fourth change value set between the quality of network service and preset quality of network service in the preset parameter set.

7. The method of claim 6, wherein the calculating the variation set of the change rate between input protocol packets and output protocol packets according to the suspect data traffic set and the normal data traffic includes:

calculating a difference between syn packet in an input direction and syn packets in an output direction, and using a ratio of the difference to the syn packets in the input direction as an increase rate of the syn packets;

calculating a difference between syn-ack packets in the input direction and syn-ack packets in the output direction, and using a ratio of the difference to the syn-ack packets in the input direction as an increase rate of the syn-ack packets; and determining a difference between the increase rate of the syn packets and the increase rate of the syn-ack packets as the variation set.

8. The method of claim 6, wherein the calculating the standard deviation set between the core data set of the normal data traffic and the preset core data set of the preset parameter set includes:

calculating a first standard deviation corresponding to the request response rates, a second standard deviation corresponding to the service success rates, a third standard deviation corresponding to the proportions of 30× status codes, a fourth standard deviation corresponding to the proportions of 40× status codes, a fifth standard deviation corresponding to the proportions of 50× status codes, and a sixth standard deviation corresponding to the delays of a normal user request in the core data set and the preset core data set; and determining a set including the first standard deviation, the second standard deviation, the third standard deviation, the fourth standard deviation, the fifth standard deviation and the sixth standard deviation as the standard deviation set.

9. The method of claim 6, wherein:

the access success rate includes a request success rate and a request delay; and the calculating the third change value set between the access success rate and the preset access success rate in the preset parameter set includes:

calculating a change rate between the request success rate in the access success rate and the request success rate in the preset access success rate;

calculating a variation between the request delay in the access success rate and the request delay in the preset access success rate; and determining the change rate and the variation as the third change value set.

10. The method of claim 1, wherein the host performance parameters include:
a quantity of half-open links after a host of the target terminal receives a first syn packet;
a host CPU of the target terminal;
a host memory of the target terminal;
a connection table of the target terminal;
input/output times of the host of the target terminal; and
an input-output traffic proportion of the host of the target terminal.

11. A system comprising:
a defense terminal that:
acquires a suspect data traffic set, the suspect data traffic set including data traffic corresponding to one or more suspect IP addresses in a suspect IP address set included in original data traffic after the defense terminal located in a cloud platform acquires, through a router, the original data traffic of a service terminal accessing a target terminal, the suspect IP address set being determined in the original data traffic according to a preset detection rule;
acquires normal data traffic, the normal data traffic being data traffic that remains after the defense terminal cleans the suspect data traffic set according to a preset defense strategy, the preset defense strategy corresponding to an expected service level agreement (SLA) level;
acquires host performance parameters, the host performance parameters being a set of parameters extracted from the target terminal after the defense terminal sends the normal data traffic to a target terminal; and
quantifies a defense result based on a target parameter set, the target parameter set including at least the suspect data traffic set, the normal data traffic, and the host performance parameters,
wherein the defense terminal includes a cloud host that determines change value sets of the parameters by using the target parameter set and a preset parameter set, matches the change value sets of the parameters with respective parameter ranges in the expected SLA level, determines that a defense effect of the defense terminal reaches the expected SLA level if the matching succeeds, and determines that the defense effect of the defense terminal does not reach the expected SLA level if the matching fails.

12. The system of claim 11, wherein the defense terminal includes:
a suspect traffic detection apparatus, connected to the router, that analyzes the copy data traffic according to the preset detection rule to obtain the suspect IP address set included in the copy data traffic, and send the suspect IP address set;
a suspect traffic cleaning apparatus, connected to the router and the suspect traffic detection apparatus, that:
acquires the suspect IP address set,
draws a suspect data traffic set in original data traffic of the core router,
cleans the suspect data traffic set according to the preset defense strategy, and
forwards normal data traffic that remains after the suspect data traffic set is cleaned to the target terminal;
wherein the cloud host is connected to the suspect traffic detection apparatus, the suspect traffic cleaning apparatus, and the target terminal, wherein the cloud host:
acquires the suspect data traffic set from the suspect traffic detection apparatus, the suspect data traffic set including suspect data traffic corresponding to each suspect IP address,
acquires the normal data traffic from the suspect traffic cleaning apparatus, and
acquires host performance parameters representing performance of the target terminal from the target terminal after sending the normal data traffic to the target terminal.

13. The system of claim 12, further comprising:
a service monitoring apparatus, connected to the cloud host, that controls multiple service hosts at different geographic locations to access the target terminal, calculates an access success rate according to a request success rate and a request delay fed back by the target terminal, and sends the access success rate to the cloud host; and
the target parameter set further includes the access success rate.

14. The system of claim 12, wherein:
the cloud host further calculates a quality of network service according to the suspect data traffic set and the normal data traffic; and
the target parameter set further includes the quality of network service.

15. The system of claim 12, wherein:
the router further forwards, to the target terminal, data traffic that remains after the suspect traffic cleaning apparatus draws the suspect data traffic set in the original data traffic.

16. The system of claim 12, wherein:
the cloud host further determines a previous defense strategy of the current defense strategy as the preset defense strategy if the matching fails,
wherein:
the preset parameter set is a pre-stored set of parameters without any attack data traffic;
the defense terminal stores multiple SLA levels arranged in order and a defense strategy corresponding to each SLA level;
a smaller SLA level represents a higher service level enjoyed by the target terminal; and
a defense strategy corresponding to a previous SLA level is superior to a defense strategy corresponding to a next SLA level.

17. The system of claim 11, wherein the host performance parameters include:
a quantity of half-open links after a host of the target terminal receives the first syn packet;
a host CPU of the target terminal;
a host memory of the target terminal;
a connection table of the target terminal;
input/output times of the host of the target terminal; and
an input-output traffic proportion of the host of the target terminal.

18. One or more memories storing thereon computer-readable instructions that, when executed by one or more processors, cause the one or more processors to perform acts comprising:
acquiring a suspect data traffic set, the suspect data traffic set including data traffic corresponding to one or more suspect IP addresses in a suspect IP address set included in original data traffic;
acquiring normal data traffic, the normal data traffic being data traffic that remains after the suspect data traffic set is cleaned according to a preset defense strategy, the preset defense strategy corresponding to an expected service level agreement (SLA) level;

acquiring host performance parameters, the host performance parameters being a set of parameters extracted from a target terminal to where the normal data traffic is sent; and quantifying a defense result at least based on the suspect data traffic set, the normal data traffic, and the host performance parameters, the quantifying the defense result based on the target parameter set includes:

determining change value sets of the parameters by using the target parameter set and a preset parameter set, wherein the preset parameter set is a pre-stored set of parameters without any attack data traffic;

matching the change value sets of the parameters with respective parameter ranges in the expected SLA level;

determining that a defense effect of the defense terminal reaches the expected SLA level if the matching succeeds; and determining that the defense effect of the defense terminal does not reach the expected SLA level if the matching fails.

* * * * *